United States Patent [19]

DeYoreo

[11] Patent Number: 4,787,560
[45] Date of Patent: Nov. 29, 1988

[54] PORTABLE LIQUID SPRAYER

[75] Inventor: Sal G. DeYoreo, Andover, Mass.

[73] Assignee: Blue Mountain Products Inc., Utica, N.Y.

[21] Appl. No.: 804,503

[22] Filed: Dec. 4, 1985

[51] Int. Cl.$^4$ ............................................. A01G 25/14
[52] U.S. Cl. ........................... 239/373; 239/374; 239/390; 222/153; 222/174; 222/402.14
[58] Field of Search .............. 239/312, 375, 378, 436, 239/195, 390, 397, 373, 569, 600; 222/402.14, 174, 153; 251/91-93

[56] References Cited

U.S. PATENT DOCUMENTS

| | | | |
|---|---|---|---|
| 688,261 | 12/1901 | Parks | 239/375 X |
| 3,135,431 | 6/1964 | Matthewson et al. | 239/373 X |
| 3,565,344 | 2/1971 | Takei | 239/373 X |
| 3,993,245 | 11/1976 | Smith | 239/373 X |
| 4,192,464 | 3/1980 | Chow | 239/375 X |
| 4,496,081 | 1/1985 | Farrey | 222/402.14 X |

FOREIGN PATENT DOCUMENTS 250252  5/1964  Netherlands ........................ 239/373

Primary Examiner—Andres Kashnikow
Assistant Examiner—Kevin Patrick Weldon
Attorney, Agent, or Firm—Anthony A. O'Brien

[57] ABSTRACT

A portable liquid sprayer has a tank adapted to contain a supply of liquid received through a fill opening, an a pump for pressurizing liquid contained therein. A first spraying mechanism includes a first control valve carried on the tank and a first nozzle removably connected to the tank. A second spraying mechanism and a second nozzle form part of a wand assembly located at one end of a flexible hose. The hose has a coupling at the opposite end adapted to be interchangeably connected to the tank in the place of the first nozzle. The first control valve has a valve seat included as an integral component of the first nozzle and without which the first control valve is incapable of preventing the flow of pressurized liquid therethrough from the tank.

6 Claims, 2 Drawing Sheets

U.S. Patent   Nov. 29, 1988   Sheet 1 of 2   4,787,560
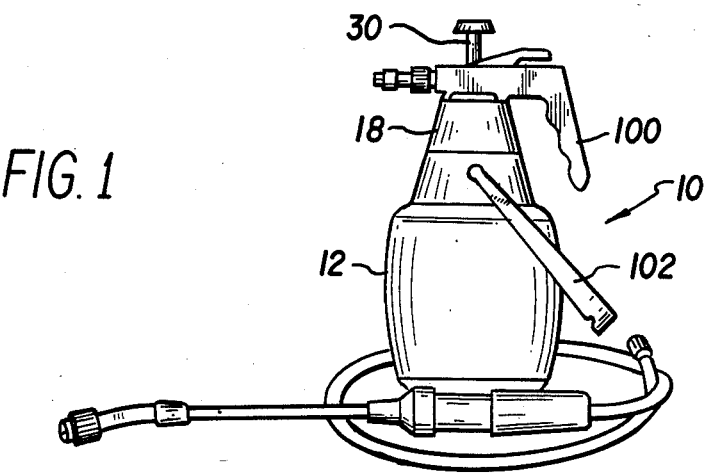
FIG. 1
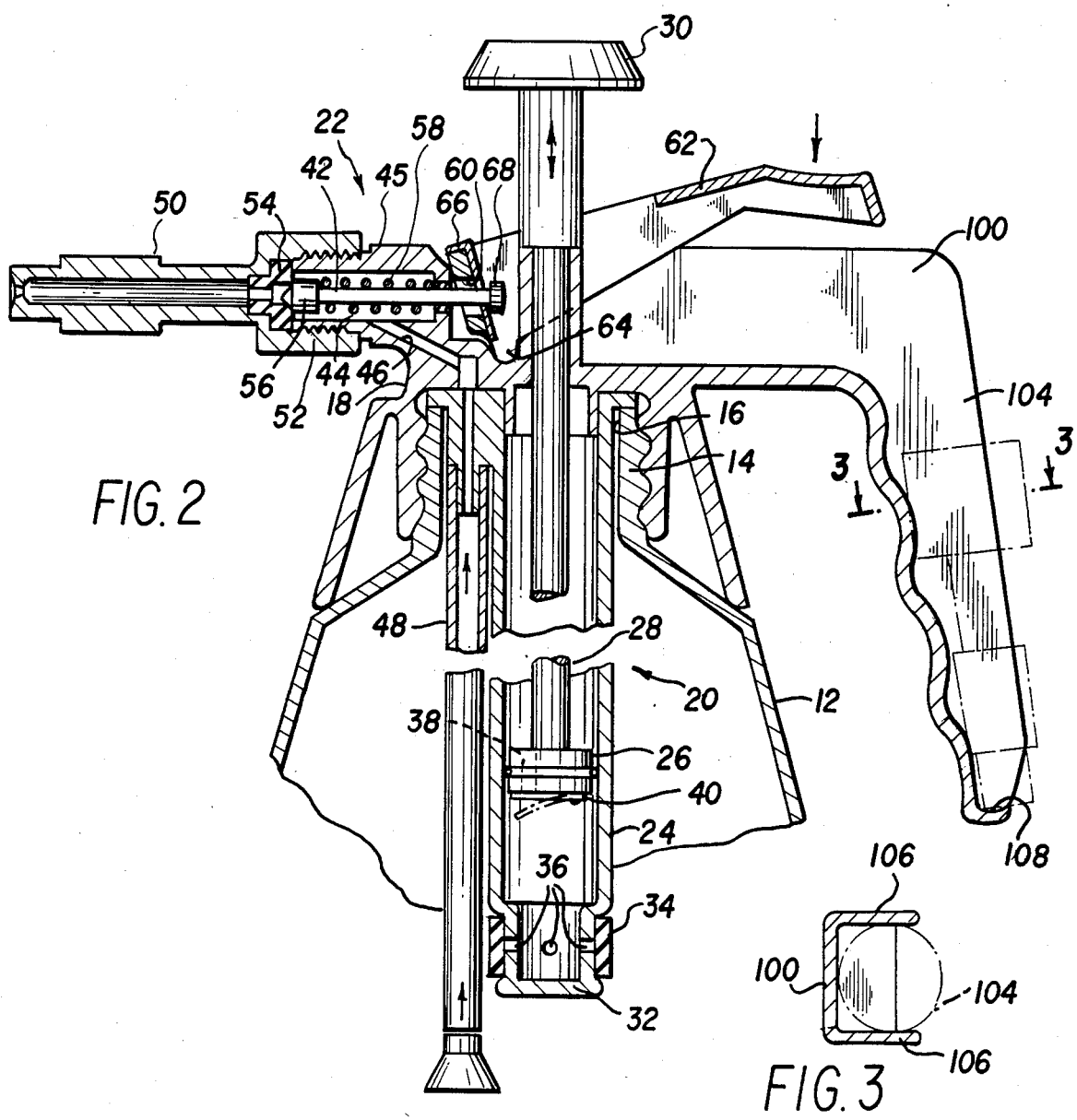
FIG. 2
FIG. 3

PORTABLE LIQUID SPRAYER

BACKGROUND DISCUSSION

1. Field of the Invention

This invention relates to portable tank-type liquid sprayers employed to spray and mist garden and house plants.

2. Description of the Prior Art

Conventional sprayers have their spraying mechanisms located either directly on the tanks, or at the ends of flexible hoses connected to the tanks. The former type is relatively compact and is suitable for spraying or misting plants which are readily accessible, e.g., potted plants conveniently located on tables or benches. However, where plants are arranged at overhead locations in hanging pots or at ground level in an outdoor garden, the latter type is preferable because the flexible hoses can be more easily manipulated without having to also raise or lower the sprayer tank to the height of the plant.

In the past, gardeners and plant enthusiasts have either had to choose between one or the other of these sprayer types, or alternatively to purchase both types.

SUMMARY OF THE PRESENT INVENTION

A primary objective of the present invention is to provide a portable tank-type liquid sprayer which has two alternatively usable spraying mechanisms. The first spraying mechanism includes a removable first nozzle and a first control valve carried on the tank itself, whereas the second spraying mechanism includes a second nozzle and a second control valve arranged in a wand assembly located at one end of a flexible hose. A coupling at the other end of the hose is adapted to be interchangeably connected to the tank in place of the removable first nozzle.

In accordance with the present invention, the first control valve has its valve seat arranged as an integral component of the removable first nozzle. Thus, when the first nozzle is removed and replaced by the aforesaid hose coupling, the first control valve is effectively rendered inoperable, thereby permitting pressurized liquid to flow past the first control valve and through the hose to the second control valve.

Preferably, the first control valve is included along with a pump as part of a head assembly which is removably threaded onto the open neck of the tank.

A fixed first handle forms part of the aforesaid head assembly and a second handle is pivotally connected to the tank. The first handle is employed to support and manipulate the sprayer when employing the first spraying mechanism, whereas the second handle is employed to carry the sprayer when the second spraying mechanism is being employed.

Advantageously, the first handle includes a recess in which the first nozzle can be stowed when not in use.

Preferably, the second handle includes means for releasably engaging and holding the wand assembly, thereby allowing all components of the device to be stored together.

BRIEF DESCRIPTION OF THE DRAWINGS

FIG. 1 is a side view of a sprayer in accordance with the present invention;

FIG. 2 is an enlarged vertical sectional view taken through the head assembly and upper tank portion of the sprayer shown in FIG. 1;

FIG. 3 is a sectional view taken along line 3—3 of FIG. 2;

DESCRIPTION OF ILLUSTRATED EMBODIMENT

Figure 4:
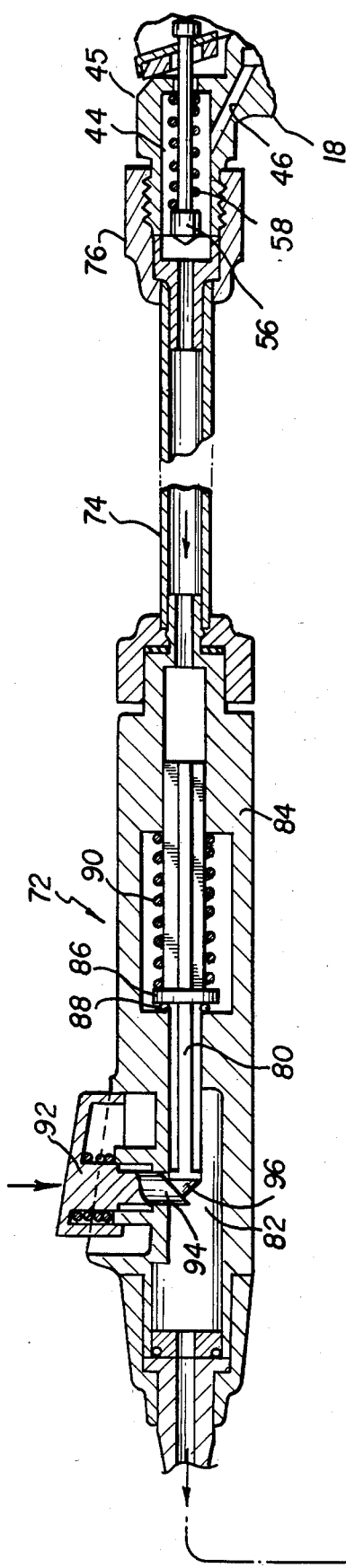
FIG. 4 is a rear view of the sprayer with the pivotal second handle in a raised position and showing the means associated therewith for releasably holding the wand assembly.
Figure 4:
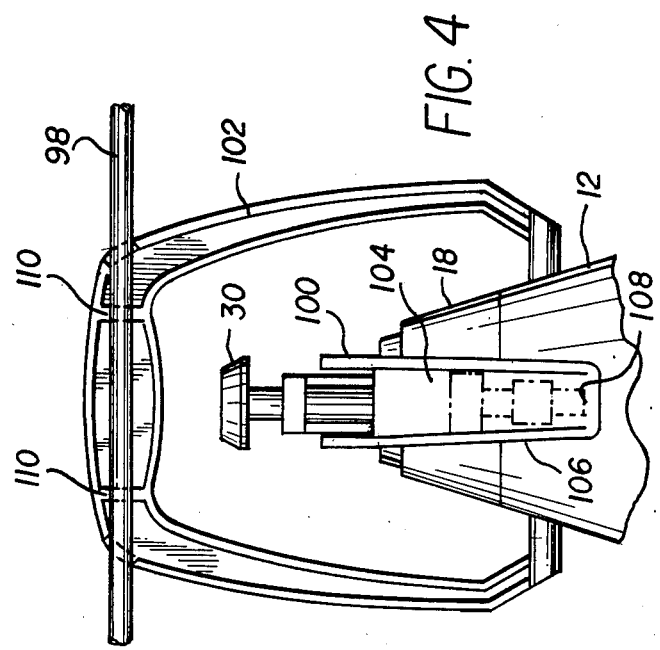

Referring initially to FIG. 1, a sprayer in accordance with the present invention is generally indicated at 10 as comprising a tank 12 having an enlarged base portion which tapers upwardly to an externally threaded neck 14 surrounding a fill opening 16. The tank is adapted to contain the liquid to be sprayed. The liquid is introduced into the tank through the fill opening.

A head assembly 18 is threaded onto the neck 14. The head assembly includes as integral components a pump 20 for pressurizing liquid contained in the tank, and a first spraying mechanism 22 for spraying pressurized liquid contained in the tank.

The pump 20 includes a cylinder 24 which depends downwardly into the tank. The cylinder contains a piston 26 which is reciprocated vertically by means of a piston rod 28 leading to an externally located handle 30. The cylinder 24 is closed at the bottom as at 32 and is provided with an external groove surrounded by an elastic ring 34. The ring 34 overlies a plurality of radial ports 36 communicating with the cylinder interior at locations beneath the piston 26.

The piston has a vertical passageway 38 extending therethrough. A resilient flapper 40 is mounted on the bottom of the piston. During the downstroke of the piston, the flapper 40 is in the position shown by the solid lines in FIG. 2 closing off the passageway 38, with air beneath the piston being forced outwardly from the cylinder 24 through the radial ports 36 and past the elastic ring 34. On the upward stroke of the piston, the elastic ring 34 closes off the radial ports 36 and the flapper 40 is flexed to the position shown by the broken lines in FIG. 2, thereby admitting air into the cylinder 24 beneath the piston. Thus, by vertically reciprocating the handle 30 and the piston 26 connected thereto by means of the piston rod 28, liquid in the tank 12 is pressurized.

The first spraying mechanism 22 includes a first control valve having a valve component 42 reciprocally mounted in a passageway 44 extending through a neck 45 on the head assembly 18. Passageway 44 is connected via passageway 46 to a tubular leg 48 leading downwardly beneath the surface of the pressurized liquid contained in the tank. A first nozzle 50 is threaded onto the neck 45 as at 52. The first nozzle contains a valve seat 54 against which an enlarged head 56 of the valve component 42 is urged by a coiled spring 58. The shaft of the valve component extends through an opening 60 in a control lever 62. The control lever has a foot 64 pivotally received in a notch in the head assembly 18. A clip 66 is inserted between the lever 62 and a second enlarged head 68 on the opposite end of the valve component 42, thereby causing the lever 62 to be pivoted in a counter clockwise direction (as viewed in FIG. 2)

under the force of spring 58. In the condition shown in FIG. 2, the enlarged head 56 on the valve component 42 is seated against the valve seat 54, thereby preventing pressurized liquid from escaping from the interior of the tank 12 through nozzle 50 via the tubular leg 48 and the communicating passageways 46, 44. However, if the lever 62 is depressed and pivoted in a clockwise direction about foot 64, the valve component 42 will be pulled to the right against the compressive force of spring 58, thereby unseating the enlarged head 56 from the valve seat 54 and allowing pressurized liquid to be sprayed through the first nozzle 50.

Figure 5:
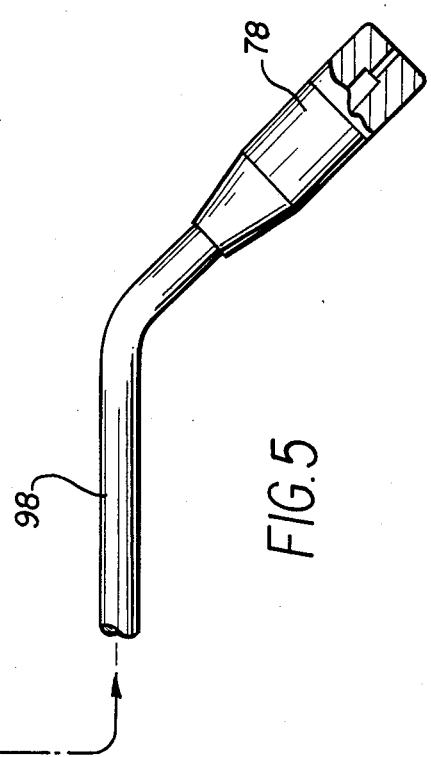
FIG. 5 is a partial view of the wand assembly showing portions thereof in cross section, and with the hose coupling connected to the sprayer head assembly.

With reference additionally to FIG. 5, the liquid sprayer further includes a wand assembly 72 connected to one end of a flexible hose 74. The opposite end of the hose 74 includes a coupling 76 which is adapted to be interchangeably mounted on the threaded neck 45 of the head assembly 18 in place of the first nozzle 50. The coupling 76 lacks a valve seat. Thus, there is nothing for the enlarged head 56 of the valve component 42 to engage, leaving a free passage for pressurized liquid to flow from the tank via passageways 46 and 44 through the hose 74 to the wand assembly 72.

The wand assembly includes a second spraying mechanism having a second nozzle 78 and a second control valve including reciprocal valve component 80 located in a passageway 82 extending through housing 84. The valve component 80 has an annular shoulder 86 which is urged into sealing engagement with a sealing ring 88 by a coiled spring 90. A spring loaded depressable button 92 has a beveled foot 94 which acts on a conical head 96 of the valve component 80 to push the latter against the compressive force of spring 90, thereby causing the annular shoulder to move away from the sealing ring 88, allowing pressurized liquid to flow through the housing 84 and through a rigid tubular wand 98 to the second nozzle 78.

The head assembly 18 further includes an integral first handle 100 which can be gripped by the user when supporting and manipulating the sprayer during operation of the first spraying mechanism 22 to spray through the first nozzle 50.

A second handle 102 is pivotally connected to the tank 12 and provides a means for the user to carry the sprayer when employing the wand assembly to spray through the second nozzle 78.

As can be best seen in FIGS. 2, 3 and 4, the first handle 100 has a rearwardly facing recess 104 with side walls 106 appropriately arranged to resiliently grip the first nozzle 50 when it is removed and stowed in the recess 104 as indicated by the broken lines in FIGS. 2–4. When thus stowed, the first nozzle rests as at 108 at the bottom of the recess 104 and is resiliently gripped between the side walls 106.

As shown in FIG. 4, the second handle 102 is preferably provided with notches 110 into which the wand 98 can be removably snapped, thereby providing a means of connecting the wand assembly to the the sprayer when storing the same.

In light of the foregoing, it will now be appreciated by those skilled in the art that the sprayer of the present invention is capable of two types of operation. In one instance, with the first nozzle 50 threaded in place as shown in FIG. 2, spraying can take place by manipulating the control lever 62 and without employing the wand assembly 72. In the second instance, with the wand assembly 72 connected via coupling 76 to the head assembly 18, spraying will take place by depressing the button 92 to control flow through the second nozzle 78.

I claim:

1. A portable liquid sprayer comprising: a tank adapted to contain a supply of liquid received through a fill opening; a pump for pressurizing liquid contained in said tank; a first spraying mechanism including a first control valve carried on said tank and a first nozzle removably connected to said tank; a second spraying mechanism and a second nozzle forming part of a wand assembly, said wand assembly being located at one end of a flexible hose, said hose having a coupling at the opposite end thereof adapted to be interchangeably connected to said tank in the place of said first nozzle, said first control valve having a valve seat included as an integral component of said first nozzle and without which said first valve is incapable of preventing the flow of pressurized liquid therethrough from said tank.

2. The portable liquid sprayer of claim 1 wherein said fill opening extends through a reduced diameter neck on said tank, and wherein said pump and said first control valve are included as integral components of a head assembly removably threaded onto said neck.

3. The portable liquid sprayer of claim 2 further comprising a fixed first handle forming part of said head assembly and a second handle pivotally connected to said tank.

4. The portable liquid sprayer of claim 3 further comprising a recess in said first handle, said recess being suitably configured and dimensioned to removably receive and hold said first nozzle in a stowed non-use position.

5. The portable liquid sprayer of claim 3 further comprising means on said second handle for releasably engaging and holding said wand assembly.

6. A portable liquid sprayer comprising:
a tank adapted to contain a supply of liquid, said tank having an opening through which said liquid may be introduced into and removed from said tank;
a head removably connected to said tank at a location closing off said opening, said head including as components thereof a pump for pressurizing liquid in said tank and a first sprayer mechanism for spraying said pressurized liquid, said first sprayer mechanism having a movable valve element associated with a valve seat, said valve seat being located in a nozzle removably connected to said head, said valve element being adjustable between a closed position coacting in contact with said valve seat to prevent the flow of pressurized liquid from said tank through said nozzle and an open position spaced from said valve seat to permit said flow, the arrangement of said valve element in relation to the valve seat contained in said nozzle being such that in the event said nozzle is removed from said head, pressurized liquid will be free to flow from said tank past said valve element regardless of the position of said valve element; and
a wand assembly including a flexible hose with a coupling at one end adapted to be interchangeably connected to said head in the place of said nozzle to receive the pressurized fluid flowing past said valve element into said hose, said wand assembly further including a second sprayer mechanism for controlling the flow of pressurized liquid through said hose.

* * * * *